June 12, 1928.  R. BISHOP  1,673,489
WORK HOLDER OR FIXTURE FOR USE IN CUTTING CAMS
Filed May 21, 1924   2 Sheets-Sheet 2
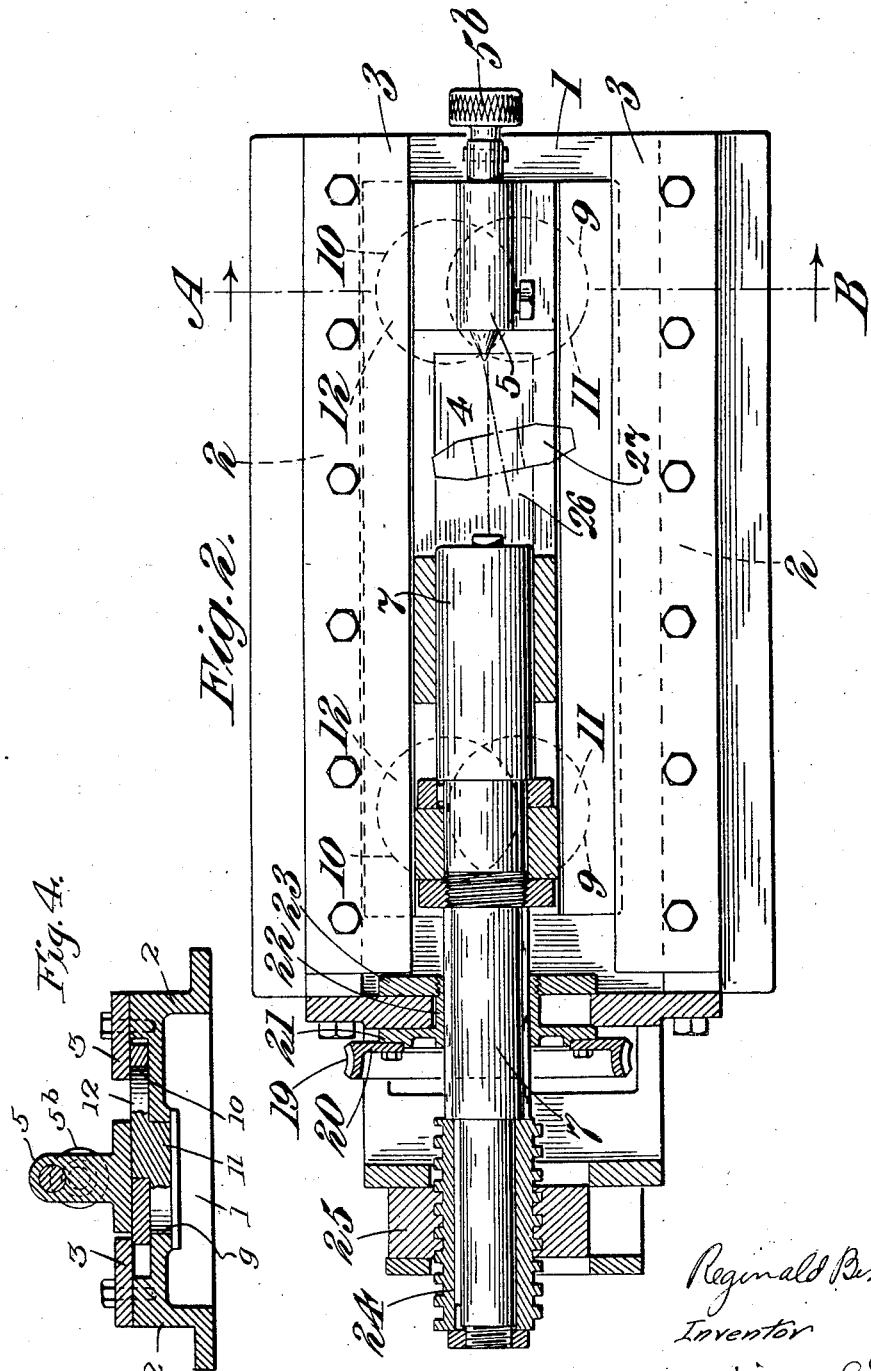

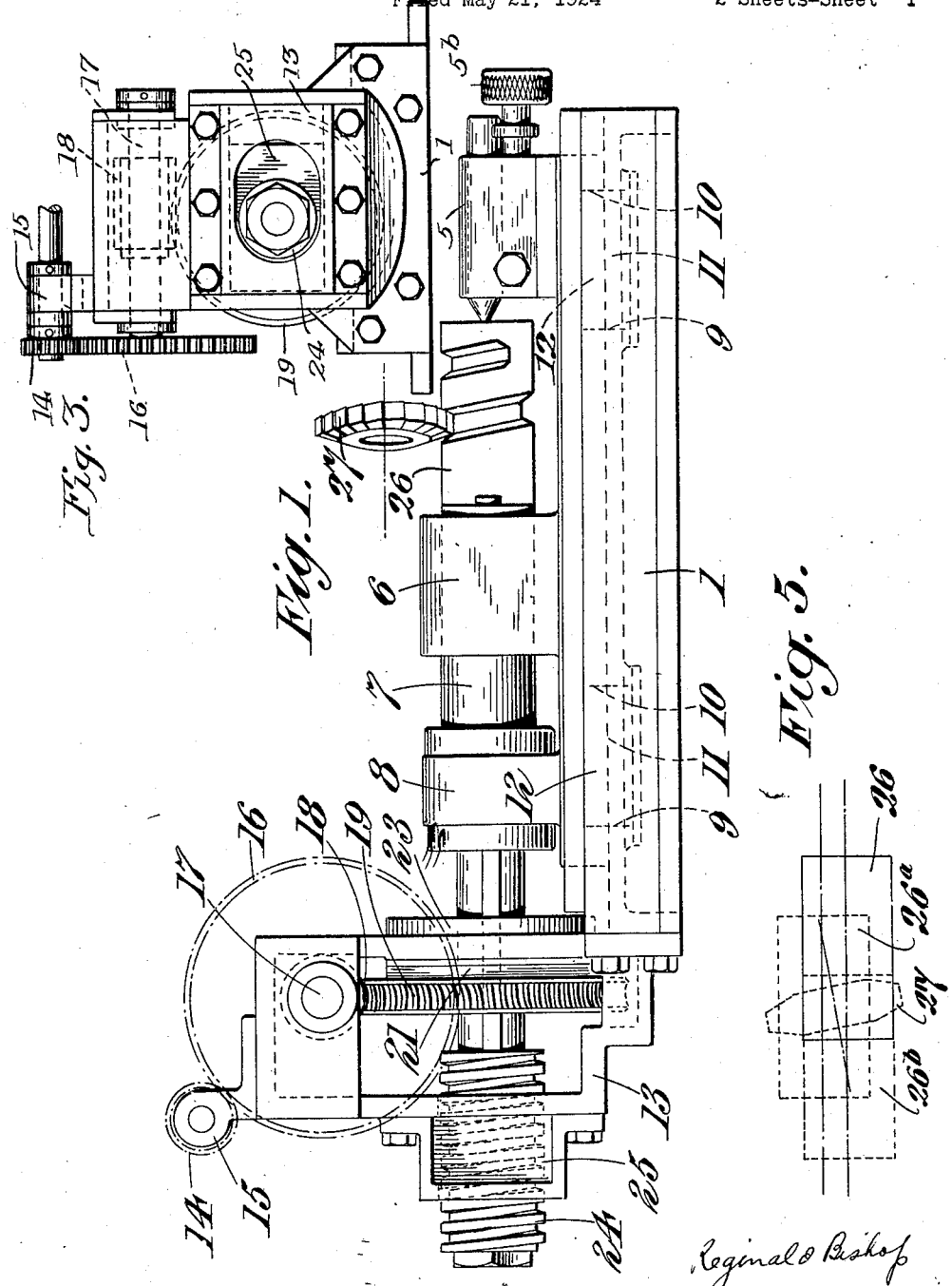

Patented June 12, 1928.

1,673,489

UNITED STATES PATENT OFFICE.

REGINALD BISHOP, OF LONDON, ENGLAND.

WORK HOLDER OR FIXTURE FOR USE IN CUTTING CAMS.

Application filed May 21, 1924, Serial No. 714,986, and in Great Britain July 25, 1923.

This invention has relation to work holders or fixtures for use in cutting cams, and it has for its object to provide work holders or fixtures for use in cutting helical cams of the shape defined in the specification of application for Letters Patent Serial No. 714,-985 filed May 21, 1924 by the applicant herein.

A work holder or fixture for use in cutting helical cams of the shape herein referred to, in accordance with this invention, comprises a carrier, work supporting means, such as headstocks, mounted thereon, means to rotate the work in relation to a tool, and means to produce a relative traversing movement between the work and the tool, said traversing movement being identical with that of the one and movable member of a pair of parallel rulers, that is to say, a compound movement comprising two components, one of which is in the same direction as the longitudinal axis of the work, and the other, if the tool be fixed such that any point of, or on, the work, moves in the arc of a circle, the two component movements occurring simultaneously and being effected without any change in the direction of the longitudinal axis of the work.

In the preferred arrangement, the carrier is mounted to slide in and between guides on a supporting member or bed and is connected to the one end of a pair of parallel links, the other ends of which are pivotally connected to the supporting member or bed.

Each of the links mentioned in the preceding paragraph may be constituted of a pair of circular discs mounted the one on the other with their axes out of alignment, one of the discs being rotatably mounted in a hole in the supporting member or bed and the other being similarly mounted in the carrier. Each pair of discs may constitute a unitary body.

The tool may comprise either a milling cutter or a grinding wheel.

In order that the invention may be clearly and readily understood, reference will now be made to the constructional embodiment illustrated in the accompanying drawings, on which:—

Fig. 1 is a side elevation;
Fig. 2 is a plan view, partly in section;
Fig. 3 an end elevation;
Fig. 4 a cross section on the line A—B, Fig. 2, and
Figure 5 is a diagram which shows the relative positions of the work and the tool at different positions of the former.

1 is a supporting member or bed, which is of any convenient construction and has ribs 2 on its upper face, the ribs 2 being at or adjacent its longer sides and extending the full length thereof. A plate 3 is secured on the upper face of each of the ribs 2, each plate being wider than its supporting rib 2 but of the same, or practically the same, length, and so mounted that it extends over a portion of the bed 1. The plates 3 in conjunction with the bed 1 and ribs 2 constitute guides for a carrier 4. The carrier 4 consists of a flat metal plate of such width that whatever position it may assume during its traversing movement it is always in engagement with the guides 2, 3. The length of the carrier 4 is also such that it is always supported over the whole of its area by the bed 1. 5, 6 are headstocks fixedly mounted on the carrier 4. The back centre of the headstock 5 is adjustable as to position and is moved by gearing contained within the headstock and actuated by a milled or knurled head 5$^b$. 7 is a shaft that extends through the headstock 6 and carries on its end adjacent the headstock 5 work carrying means, such as a chuck. The other end of the shaft 7 is connected with gearing such that rotary motion is imparted thereto and through it to the work and also the traversing movement to the carrier. The shaft 7 is supported in a second bearing 8 fixedly mounted on the carrier 4. 9, 9 are circular holes which are formed in the upper face of the bed 1; the holes 9, 9 are disposed in line and each is disposed towards one end of the bed 1. 10, 10 are circular holes formed in the lower face of the carrier 4; the holes 10, 10 are disposed in line and spaced the same distance apart as the holes 9, 9, but with their centres displaced so that they overlap partially the holes 9, 9.

Mounted in each pair of holes 9, 10 is a member of a pair of parallel links each constituted of two circular discs 11, 12. The two discs constituting a link are riveted or otherwise secured together or are integtal, the discs being so connected or fashioned that their centres are displaced, the displacement being the same as that of the centres of the holes 9, 10. The discs 11 are placed within the holes 9 and the discs 12 within the holes 10, and are rotatable in relation thereto. When the carrier 4 is traversed as hereafter explained, the discs 11, 12 move in a rotary sense in the holes 9, 10, respectively.

13 is a framework or structure mounted on the one end of the bed 1 and carrying the gearing by which the shaft 7 is rotated and the carrier 4 is traversed. 14 is a driving pinion, the shaft of which is mounted in a bearing 15 on the framework 13 and is driven either directly or indirectly from a prime mover there being suitable gearing between the shaft and prime mover to produce either forward or reverse motion. The pinion 14 meshes with a spur wheel 16 mounted on a shaft 17 that is carried in bearings in the framework 13. The shaft 17 also carries a worm 18 which meshes with a worm wheel 19. The worm wheel 19 drives the shaft 7 but is not mounted directly thereon. The worm wheel 19 comprises a rim on the periphery of which the teeth are cut and a flange 20 by which it is bolted to a flange 21 on one end of a sleeve 22 that is mounted on the shaft 7 and with which it has a feather and slot connection. On the other end of the sleeve 22 an annular disc 23 is screwed. The flange 21 and the annular disc 23 come on opposite sides of a portion of the framework 13 and constitute stops to prevent or limit endwise movement of the sleeve 22 in relation to the shaft 7: they also constitute guides. The shaft 7 and sleeve 22 are in driving connection but the shaft 7 is capable of endwise movement in relation thereto. 24 is a sleeve that is mounted on the extreme end of the shaft 7 and is in driving connection therewith. The sleeve 24 is screw threaded externally and meshes with a nut 25 that is mounted in guides in the framework 13: the nut 25 is thus incapable of rotation but is capable of movement along the guides. The nut 25 and sleeve 24 are easily removable and replaceable by other members of different pitch, and similarly the links 11, 12 may be replaceable by other links whose centres are displaced to a different extent. 26 indicates the work and 27 the tool.

The arrangement of the parts described is such that when the pinion 14 is driven, its motion is transmitted through the spur wheel 16, worm 18 and worm wheel 19 to the shaft 7 which is rotated; as the shaft 7 is rotated it is also caused to move endwise owing to the engagement of the sleeve 24 with the nut 25. The rotary motion of the shaft 7 is transmitted to the work 26 mounted in the headstocks 5, 6 and its endwise movement to the carrier 4 which is caused to move similarly and owing to its linkage with the bed 1 to travel in a path such that any point on the carrier moves in the arc of a circle. The latter movement causes the shaft 7 to move laterally or across the bed 1 and it is on account of this movement that the nut 25 is mounted in guides and the worm wheel 19 is provided with the guides 21, 23. The worm 18 is also made of such length that it remains in mesh with the worm wheel 19. The gearing described is so designed that the tool will complete its cut while the carrier 4 is moving from one end position to the other.

The tool 27 is so mounted in relation to the work 26 when the bed 1 is in a horizontal position that it will commence and complete its cut on one and the same side of a vertical plane passing through the longitudinal axis of the work and during its operation the work will be moved so that the said plane is brought under the tool twice, and between such times the tool operates on the other side of the plane to that at which it commences and completes its cut.

Figure 5 illustrates diagrammatically three positions of the work 26, 26$^a$, and 26$^b$ in relation to the tool 27, namely, at the beginning, middle, and end of the cut.

It will be seen that the cam produced has a pitch varying from end to end. A cam may, however, be produced having a constant pitch from end to end, and when such a cam is desired, the nut 25 is mounted so as to be capable of controlled and limited rotational and rectilineal movement in both directions, its rotational movement in each direction being such that its rectilineal movement is equal to the length of a line perpendicular to the chord joining the ends of the arc of movement of the work holder, said line being situated midway of the ends of the chord and extending to the said arc of movement.

What I claim is:—

1. Means for cutting helical cams of the shape herein referred to comprising a carrier and a tool, a pair of parallel links having one of said members pivotally mounted at one end thereof, works supporting means mounted on the carrier, means to rotate the work in relation to the tool, and means to impart a traversing movement to the member mounted on the parallel links in relation to the other member.

2. Means for cutting helical cams of the shape herein referred to, comprising a supporting member, guides thereon, a carrier mounted to slide in said guides, work supporting means mounted on the carrier, means to rotate the work in relation to a tool, a pair of parallel links pivotally connected at their one ends to the supporting member and at their other ends to the carrier, and means to impart traversing movement to the carrier in relation to the supporting member.

3. Means for cutting helical cams of the shape herein referred to, comprising a supporting member, guides thereon, a carrier mounted to slide in said guides, work supporting means mounted on the carrier, means to rotate the work in relation to a tool, a pair of parallel links pivotally connected at their one ends to the supporting member and at their other ends to the carrier, each link being constituted of a pair of circular discs mounted one on the other with their axes out of alignment, one of the discs being rotatably mounted in a hole in the supporting member and the other in a hole in the carrier, and means to impart traversing movement to the carrier in relation to the supporting member.

4. Means for cutting helical cams of the shape herein referred to, comprising a supporting member, guides thereon, a carrier mounted to slide in said guides, a shaft mounted on the carrier, work carrying means mounted on the shaft, gearing to rotate the work in relation to a tool mounted on the carrier and in connection with the shaft, a pair of parallel links pivotally connected at their one ends to the supporting member and at their other ends to the carrier and means to impart traversing movement to the carrier in relation to the supporting member.

5. Means for cutting helical cams of the shape herein referred to, comprising a supporting member, guides thereon, a carrier mounted to slide in said guides, a shaft mounted on the carrier, work carrying means mounted on the shaft, gearing mounted on the carrier and in connection with the shaft to rotate the work in relation to a tool, a pair of parallel links pivotally connected at their one ends to the supporting member and at their other ends to the carrier, a screw thread on the shaft and a nut engaging the screw thread and fixed against rotation.

6. Means for cutting helical cams of the shape herein referred to, comprising a supporting member, guides thereon, a carrier mounted to slide in said guides, a shaft mounted on the carrier, work carrying means mounted on the shaft, gearing mounted on the carrier and in connection with the shaft to rotate the work in relation to a tool, a pair of parallel links pivotally connected at their one ends to the supporting member and at their other ends to the carrier, each link being constituted of a pair of circular discs mounted one on the other with their axes out of alignment, one of the discs being rotatably mounted on a hole in the supporting member and the other in a hole in the carrier, and means to impart traversing movement to the carrier in relation to the supporting member.

7. Means for cutting helical cams of the shape herein referred to comprising a supporting member, guides thereon, a carrier mounted to slide in said guides, a shaft mounted on the carrier, work carrying means mounted on the shaft, gearing mounted on the carrier and in connection with the shaft to rotate the work in relation to a tool, a pair of parallel links pivotally connected at their one ends to the supporting member and at their other ends to the carrier, each link being constituted of a pair of circular discs mounted one on the other with their axes out of alignment, one of the discs being rotatably mounted in a hole in the supporting member and the other in a hole in the carrier, a screw thread on the shaft and a nut engaging the screw thread and fixed against rotation.

Dated this 28th day of January, 1924.

REGINALD BISHOP.